March 28, 1961 H. L. DANIELS ET AL 2,977,578
CONTROLLED CIRCUITS FOR INTERIM STORAGE SYSTEMS
Filed Nov. 29, 1957 2 Sheets-Sheet 1

C. W. Fritze
H. L. Daniels
R. R. Ritter
INVENTOR.

BY J. A. O'Connell
Louis W. Scrivogo.

March 28, 1961 H. L. DANIELS ET AL 2,977,578

CONTROLLED CIRCUITS FOR INTERIM STORAGE SYSTEMS

Filed Nov. 29, 1957 2 Sheets-Sheet 2

C. W. Fritze
H. L. Daniels
R. R. Ritter
INVENTOR.

BY 2,977,578
Patented Mar. 28, 1961

2,977,578

CONTROLLED CIRCUITS FOR INTERIM STORAGE SYSTEMS

Howard L. Daniels, West St. Paul, and Curtis W. Fritze and Rolland R. Ritter, Arden Hills, Minn., assignors, by mesne assignments, to the United States of America as represented by the Secretary of the Navy Filed Nov. 29, 1957, Ser. No. 699,876

5 Claims. (Cl. 340—174.1)

The present invention relates generally to data storage and processing equipment and more particularly to apparatus for and methods of transferring binary digital information into and out of an interim signal storage medium at a controllable rate.

It is well known that electronic computers have reached a stage of development where their speed of operation far exceeds the rate at which complementary translating mechanisms can convert their output signals into, for example, perforated or printed form. Hence, it is necessary that the data processing system include as a component thereof a buffer or interim signal storage circuit for temporarily registering the output signals from the computer. With such a provision, the computer is not forced to operate at less than its maximum speed and wasteful delays in reading out data from the computer are avoided.

Magnetic tape provides a generally satisfactory medium for this interim signal storage because it can be loaded at relatively high speed and thereafter its information can be transferred to the electromechanical signal converting mechanism at a reduced speed by using a slow or intermittent tape drive. However, one of the difficulties inherent in the employment of tape is its tendency to skew at high speeds and produce, during playback, nonsynchronous signals from pulses which were previously recorded thereon at the same instant of time. This can cause spurious operation of the output device since digits from parts of two adjacent characters may be treated as belonging to a single character.

In high density signal storage arrangements using magnetic tape, the same type of nonsynchronous transmission of pulses may occur in the transfer of signals from the computer to the tape with the results mentioned above. That is, a group of signals appearing in the computer output and identifying a particular character may be sent to the magnetic recording heads at slightly different times so that their corresponding "cells" are not recorded in alignment across the tape. Thus, when the tape is subsequently read out, the playback pulses tend to be further out of time synchronism and the possibility of character confusion is increased.

It is accordingly a primary object of the present invention to provide an arrangement whereby digital information pulses recorded in the magnetic tape at the same instant of time are subsequently resynchronized after they have been read out of the tape.

Another object of the present invention is to eliminate the effect of tape skewing during playback whereby digital information pulses recorded in alignment on said tape are subsequently synchronized after they have been read out of the tape.

A further object of the present invention is to provide a circuit for resynchronizing the individual pulses constituting a single character in the playback cycle and for feeding these pulses to a signal converting mechanism at a controllable rate.

An additional object of the present invention is to provide a system for transferring pulses from a computer to a magnetic tape for interim storage whereby the individual pulses making up a character are stored in an aligned row on said tape with a controllable spacing between successive rows.

A still further object of the present invention is to synchronize the output signals from a computer so that the signals representing a particular character can be stored in alignment across the surface of a magnetic tape.

A still further object of the present invention is to provide means for controlling the rate of recording pulse information on a magnetic tape whereby even spacing of characters at a desired density is obtained.

A still further object of the present invention is to provide means for disabling the read out circuit of an interim storage system during the time it takes for an output device to convert the pulses read out into a different form.

A still further object of the present invention is to provide a circuit for transferring pulse information stored in a magnetic tape to an electromechanical device and for preventing any false pulses due to interference from the output device from causing spurious operation of the equipment.

Other objects and many of the attendant advantages of this invention will be readily appreciated as the same becomes better understood by reference to the following detailed description when considered in connection with the accompanying drawings, wherein.

Figure 1:
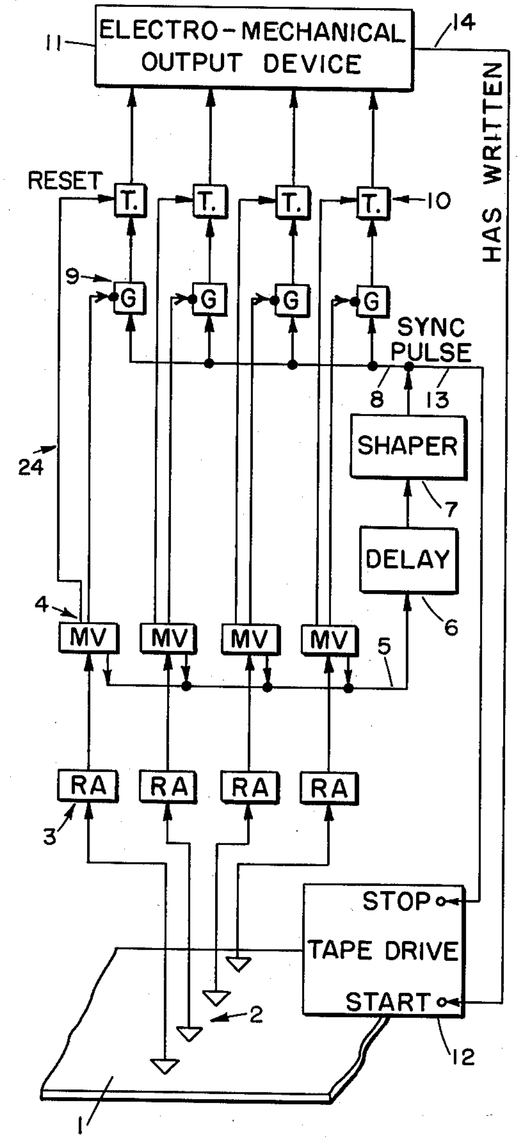
Fig. 1 is a block diagram of an arrangement for transferring digital pulses from a magnetic tape to an electromechanical output device at a controllable rate.

Referring now to Fig. 1 of the drawings, there is shown a length of magnetic tape 1 having recorded therein binary digital information. Each recorded character consists of four binary elements with only the binary element "1" represented by a magnetically polarized area or cell. It will be appreciated that other types of character representation may be utilized and that the above is an exemplar and, as such, is not a limiting factor in the system hereinafter described.

A group of magnetic heads 2, one for each binary element, is positioned in alignment adjacent to the tape surface for read out purposes. Each of these heads generates a voltage pulse only when it scans a "1" cell. After amplification in amplifiers 3, these pulses are employed to selectively activate a like plurality of monostable multivibrators 4. One set of outputs from these multivibrators is connected to the inputs of gates 9 for placing these gates in an enabled status; the other is fed to a common line 5. Because of this common connection, a positive rectangular pulse appears in this line as soon as the first "1" cell of a particular character is detected by one of the magnetic heads 2. This pulse is, in turn, subjected to a predetermined amount of delay in circuit 6, formed into a sync pulse by shaper 7, and then coupled to the other inputs of the gates 9. It passes through those gates which have been previously enabled and triggers a corresponding group of thyratrons 10, thereby causing the operation of the electromechanical output device 11.

Any misalignment in the cells constituting a single character merely has the effect of triggering multivibrators 4 and enabling gates 9 at slightly different times. However, since it is the time of occurrence of the sync pulse alone that determines the moment at which the thyratrons are fired, these variations have no influence on the performance of the output device 11.

The time delay imparted to the rectangular pulse in line 5 by delay circuit 6 is slightly shorter than the time constant of the monostable multivibrators 4 and slightly longer than half the period between adjacent rows of cells. The first relationship insures that each of the multivibrators is set prior to the appearance of a sync pulse at line 8. The delay sync pulse is also coupled via line 13 to the stop circuit of the tape drive mechanism. Consequently, because of the second relationship, the tape is stopped with the heads 2 approximately midway between adjacent rows of cells. A control pulse or "has written" pulse originating at the electromechanical device 11 and fed over line 14 to the tape drive mechanism starts the tape advancement for the next read out cycle. Any conventional arrangement can be employed to produce the aforementioned pulse such as, for example, the movement of a universal key activated each time a character is formed by the electromechanical output device. Prior to the appearance of the "has written" pulse, the activated monostable multivibrators return to their standby status. When these multivibrators are reset, gates 9 are disabled and negative pulses, produced by this resetting action, are applied via lines 24 to the anode circuits of the thyratrons 10. These pulses drive the anode potentials of those tubes which have been previously fired below the value necessary to sustain ionization therein and the system returns to its original standby condition, ready for a second operation.

Figure 2:
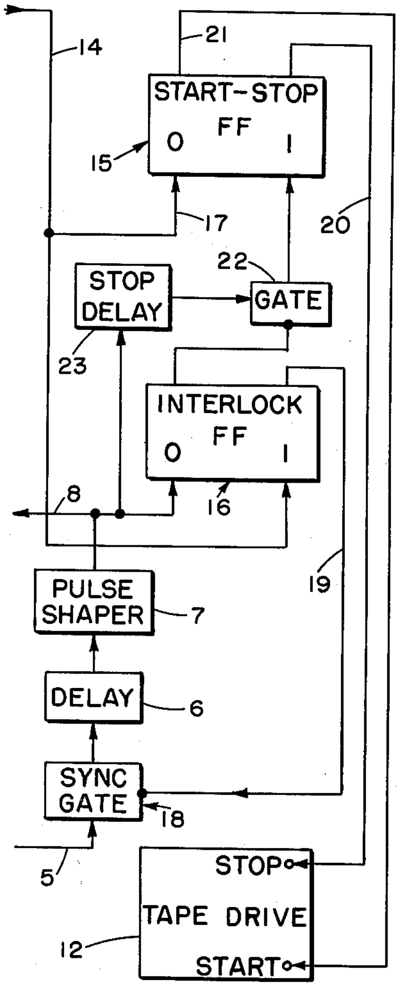
Fig. 2 is a box diagram of a supplemental circuit which can be used with the system of Fig. 1 for disabling the signal transfer process during the time the output device is operating.

It is sometimes desirable to disable the transfer circuit during the time the electromechanical signal converting mechanism is operating so as to insure against the production of spurious sync pulses which might arise as a result of the reaction of the signal converting mechanism on the transfer circuit. Fig. 2 illustrates a modification to Fig. 1 for achieving this result.

When the electromechanical device 11 generates a "has written" pulse in line 14, this pulse passes via line 17 to start-stop, flip-flop 15, and the triggering of this circuit results in the application of a pulse to the start side of the tape drive mechanism 12 whereby the next character is presented to the read out heads. At the same time, the "has written" pulse also triggers interlock flip-flop 16 and allows this circuit to supply an enabling pulse to sync gate 18 over line 19. With sync gate 18 in this condition, the next pulse appearing in the common output line 5 of multivibrators 4 passes therethrough to delay circuit 6 and is formed into a sync pulse by shaper 7 for subsequently activating the various thyratrons in the manner hereinabove set forth in connection with Fig. 1.

This sync pulse also resets interlock flip-flop 16 and thereby disables sync gate 18 and any signal transfer between the tape and the electromechanical output device and enables gate 22. The sync pulse is also applied to a stop delay circuit 23. If the next "has written" pulse does not reset interlock flip-flop 16 before the sync pulse traverses stop delay circuit 23, this pulse passes through gate 22, resets start-stop, flip-flop 15, and causes the tape drive to stop the tape advancement, the necessary pulse for this stoppage being supplied to tape drive mechanism 12 over line 20. If, however, the next read out pulse does appear in line 14 before the sync pulse passes through stop delay 23, interlock flip-flop 16 resets in time to disable gate 22 and prevents the sync pulse from carrying out the above operation. As a result, the tape drive continues to advance the tape for a second read out cycle.

Since the sync pulse appears at line 8 at a time when the reading heads are midway between adjacent rows of cells, stop delay circuit 23 should impart a delay to the sync pulse about twice that given it by delay circuit 6 which, it will be recalled, was approximately equal to half the period between adjacent rows of pulses. If such is the case, then, in the absence of a "has written" pulse in line 14, the start-stop, flip-flop 15 will disable the tape drive mechanism with the read out heads midway between successive characters. It will be seen that the above arrangement allows the tape to run continuously so long as successive characters are detected by the read out heads.

Figure 3:
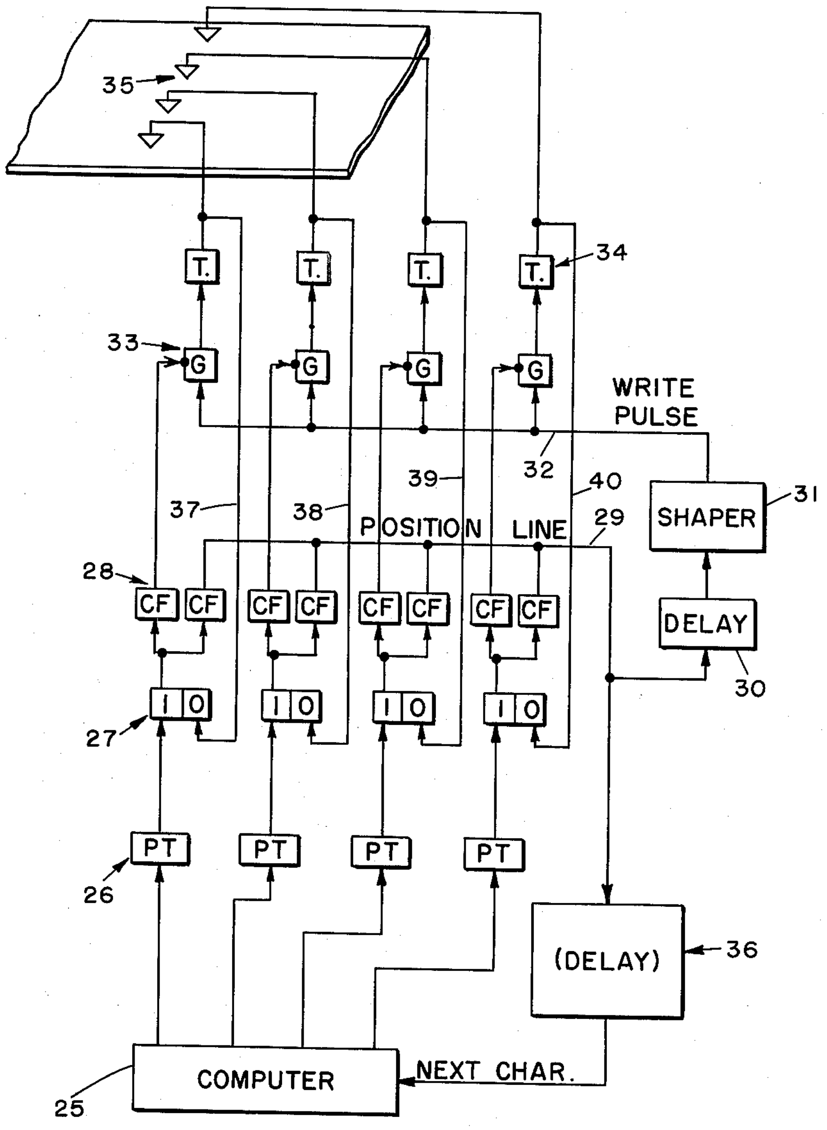
Fig. 3 is a block diagram of a system for insuring that the signals from a computer which represent characters are stored on a magnetic tape in aligned rows with a particular spacing therebetween.

Fig. 3 illustrates an arrangement for transferring binary coded decimal data from a computer 25 to a four-level magnetic tape 36 at a controllable rate. As shown in this figure, pulses from the computer are coupled via pulse transformers 26 to a group of buffer storage flip-flops 27 which are set according to the coding of the incoming character. When the first of these flip-flops is set to a "1" position, a positive pulse appears in position line 29, the common output of one of the cathode follower pairs 28. The positive pulses at the companion cathode followers enable certain of the gates 33. The aforementioned positive pulse in line 29 is delayed in circuit 30 and shaped in circuit 31. Afterwards it passes through those gates 33 which have been previously enabled and fires selected ones of the thyratrons 34 which generate pulses for recording in tape 36 by heads 35. The thyratron outputs also reset flip-flops 27 by means of the connections established by lines 37 to 40 to the "0" sides of these circuits so that position line 29 returns to its original negative level after the recording operation. This transition is detected by delay circuit 36 which is responsive solely to negative input pulses and results in a delayed "has written" pulse being sent to the computer to call for the next character. To make the delay circuit 36 so responsive, a simple diode may be connected in series therewith poled to pass negative pulses only. The length of delay imparted by circuit 36 governs the recording rate and the density at which successive characters are stored on the magnetic tape 36.

Some means must be provided, of course, to delay the receipt of the first character from the computer until the magnetic tape reaches operating speed. Then, if no information comes from the computer during a predetermined time interval, economy requires that means be incorporated into the system for stopping the tape. Such means are not shown since they do not fall within the present invention and can be supplied by anyone skilled in the art.

It will thus be seen that in the recording and playback systems of Figs. 1 and 3, the sync pulse or write pulse eliminates the need for a separate timing track on the tape and that the density and/or rate at which characters are transferred to the tape from the computer or from the tape to the electromechanical device may be readily varied by simply altering the time delay of circuits 30, 36 and 6.

Obviously many modifications and variations of the present invention are possible in the light of the above teachings. It is therefore to be understood that within the scope of the appended claims the invention may be practiced otherwise than as specifically described.

What is claimed is:

1. In combination, a magnetizable tape having binary characters recorded therein as spaced parallel rows composed of various numbers of polarized cells, a plurality of aligned read out heads positioned adjacent the surface of said tape, each of said heads scanning one of said cells when said tape is fed therepast and producing a voltage pulse when the magnetic level of the tape beneath it changes, a like plurality of monostable multivibrators, means for coupling each of the voltage pulses so produced to a different monostable multivibrator whereby these multivibrators are triggered to generate rectangular pulses, a like plurality of gate circuits, each of said gate circuits having one of its inputs connected to one of said multivibrators whereby said gate circuits are enabled by said rectangular pulses, a control gate and a delay circuit having a time delay less than the reset time of said multivibrators and a pulse shaper connected in series, means for feeding the rectangular pulses generated by said multivibrators to one input circuit of said control gate whereby a first delayed spiked pulse is produced in the output circuit of said pulse shaper from the rectangular pulse of the multivibrator which is first triggered when said control gate is in an enabled condition, means for coupling said spiked pulse to the other inputs of said gates whereby said spiked pulse is passed through those gates which have been previously enabled by said rectangular pulses, an electromechanical signal converting mechanism, means controlled by the passed spiked pulses for selectively operating said mechanism, means responsive to the operation of said mechanism for enabling said control gate and for advancing said tape whereby the next row of cells is presented to said read out heads and a second delayed spiked pulse produced, said control gate being disabled if a second delayed pulse is produced before a second operation of said electromechanical signal converting mechanism.

2. In combination, a magnetizable tape having binary characters recorded therein as spaced, parallel rows composed of various numbers of polarized cells, a plurality of aligned, read-out heads positioned adjacent the surface of said tape, each of said heads scanning one of said cells when tape is fed therepast and producing a voltage pulse only when the magnetic level of the tape beneath it changes, a like plurality of monostable multivibrators, means for coupling each of the voltage pulses so produced to a different monostable multivibrator whereby these multivibrators are triggered to generate rectangular pulses, a like plurality of gate circuits, each of said gate circuits having one of its inputs connected to one of said multivibrators whereby said gate circuits are enabled by said rectangular pulses, a delaying circuit having a time delay less than the reset time of said multivibrators and a pulse shaper connected in series, means for feeding the rectangular pulses generated by said multivibrators to the input circuit of said delay circuit whereby the first delayed spike pulse is produced in the output circuit of said pulse shaper from the rectangular pulse of the multivibrator which is first triggered, means for coupling said spike pulse to the other input of said gate whereby said spike pulse is passed through those gates which have been previously enabled by said rectangular pulses, an electromechanical signal converting mechanism, means for selectively operating said mechanism in accordance with the permutation of the passed spike pulses, means responsive to the operation of said mechanism for producing a written pulse, means controlled by said written pulse for starting the tape feed whereby the next row of cells is scanned by said read-out heads and a second delayed spike pulse produced from the rectangular output pulse of the first multivibrator triggered as a consequence thereof, and means for stopping the tape feed if said second delayed spike pulse does not occur within a predetermined time after said first delayed spike pulse.

3. In an information transfer system of the type wherein a magnetic tape having rows of binary information stored therein moves past a group of aligned sensing heads which generate combinations of output pulses in accordance with the composition of each row being scanned, an electromechanical signal converting mechanism, means responsive to the appearance of the first pulse of any particular combination of pulses for transferring at one time all the pulses of said combination to said converting mechanism, thereby to cause its selective operation, said mechanism producing a control pulse whenever it has completed its operation, a start-stop drive mechanism for controlling the movement of said tape past said sensing heads, a flip-flop circuit, said flip-flop circuit having one output connected to the start circuit and the other output connected to the stop circuit of said tape drive mechanism, means for feeding said control pulses to one input of said flip-flop circuit thereby to control the starting of said tape, and means for producing a trigger pulse at the other input of said flip-flop whenever a control pulse is not produced within a predetermined time after the appearance of any first output pulse, thereby to control the stopping of said tape.

4. In an arrangement as defined in claim 3 wherein said means for producing said trigger pulse comprises a gate circuit, means for enabling said gate circuit in response to each first output pulse, means for feeding each of said first output pulses after a predetermined time delay to an input of said gate whereby said trigger pulse is produced in the output circuit of said gate whenever a delayed pulse arrives while said gate is enabled, means for disabling said gate whenever a control pulse is generated by the operation of said signal converting mechanism, and means for feeding said trigger pulse to the other input of said flip-flop circuit.

5. In an arrangement as defined in claim 3, means for preventing the transfer of any subsequent combination of voltage pulses to said converting mechanism until a control pulse has been produced by said signal converting mechanism.

References Cited in the file of this patent

UNITED STATES PATENTS

| | | |
|---|---|---|
| 2,625,607 | Eckert et al. | Jan. 13, 1953 |
| 2,760,063 | Andrews | Aug. 21, 1956 |
| 2,793,344 | Reynolds | May 21, 1957 |
| 2,817,072 | Chien | Dec. 17, 1957 |
| 2,817,829 | Lubkin | Dec. 24, 1957 |
| 2,827,623 | Ainsworth | Mar. 18, 1958 |